(12) United States Patent
Palupunoori et al.

(10) Patent No.: US 10,911,859 B2
(45) Date of Patent: *Feb. 2, 2021

(54) AUDIO STREAMING CHARGING CASE

(71) Applicant: Bose Corporation, Framingham, MA (US)

(72) Inventors: Naren Reddy Palupunoori, Natick, MA (US); Taylor Russell, Quincy, MA (US); Douglas Warren Young, Arlington, MA (US)

(73) Assignee: Bose Corporation, Framingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/880,283

(22) Filed: May 21, 2020

(65) Prior Publication Data
US 2020/0280787 A1 Sep. 3, 2020

Related U.S. Application Data

(63) Continuation of application No. 16/240,268, filed on Jan. 4, 2019.

(51) Int. Cl.
| | | |
|---|---|---|
| *H04R 1/10* | (2006.01) | |
| *H02J 7/00* | (2006.01) | |
| *H04R 3/12* | (2006.01) | |
| *H04R 1/02* | (2006.01) | |
| *H01M 10/623* | (2014.01) | |

(52) U.S. Cl.
CPC ........ *H04R 1/1025* (2013.01); *H01M 10/623* (2015.04); *H02J 7/0044* (2013.01); *H04R 1/02* (2013.01); *H04R 1/1016* (2013.01); *H04R 3/12* (2013.01); *H04R 2420/07* (2013.01)

(58) Field of Classification Search
CPC ...... H04R 1/1025; H04R 1/02; H04R 1/1016; H04R 3/12; H04R 2420/07; H01M 10/623; H02J 7/0044
USPC ........................................................ 381/384
See application file for complete search history.

(56) References Cited

U.S. PATENT DOCUMENTS

| | | |
|---|---|---|
| 9,906,851 B2 | 2/2018 | Schrems |
| 10,083,600 B1 | 9/2018 | Patil et al. |
| 2004/0255760 A1 | 12/2004 | Cheng |
| 2005/0181826 A1 | 8/2005 | Yueh |
| 2005/0268319 A1 | 12/2005 | Brady, Jr. |
| 2006/0075347 A1 | 4/2006 | Rehm |
| 2007/0201703 A1 | 8/2007 | Dorogusker et al. |
| 2008/0039017 A1 | 2/2008 | Kim |

(Continued)

OTHER PUBLICATIONS

LID , Android Phone , p. 1 , 20151.

*Primary Examiner* — Sean H Nguyen
(74) *Attorney, Agent, or Firm* — Bond, Schoeneck & King, PLLC

(57) ABSTRACT

The present disclosure relates to audio systems for streaming audio data to wireless audio devices from a portable charging case. The portable charging case is arranged to wirelessly charge first and second wireless audio devices as well as stream audio data to the first and second wireless audio devices. The portable charging case can store audio files/audio data within an internal memory, or receive audio data from an external source, e.g., a cable arranged to transmit digital or analog audio data. The portable charging case is further arranged to automatically start streaming audio data to the first and/or second wireless audio devices when a cable is connected to the portable charging case.

20 Claims, 6 Drawing Sheets

(56) References Cited

U.S. PATENT DOCUMENTS

| | | |
|---|---|---|
| 2008/0212971 A1 | 9/2008 | Shaanan et al. |
| 2010/0124947 A1 | 5/2010 | Sano |
| 2014/0327826 A1 | 11/2014 | Huang |
| 2015/0326970 A1 | 11/2015 | Miske et al. |
| 2016/0173160 A1 | 6/2016 | Gronewoller et al. |
| 2017/0064429 A1 | 3/2017 | Hirsch et al. |
| 2017/0201844 A1 | 7/2017 | Smith et al. |
| 2019/0069082 A1 | 2/2019 | Carreras et al. |
| 2019/0268706 A1 | 8/2019 | Solum et al. |
| 2020/0107099 A1 | 4/2020 | McIntosh et al. |
| 2020/0107102 A1 | 4/2020 | Sang et al. |
| 2020/0107106 A1 | 4/2020 | Sang et al. |

AUDIO STREAMING CHARGING CASE

CROSS REFERENCE TO RELATED APPLICATIONS

This application is a Continuation of U.S. patent application Ser. No. 16/240,268 filed Jan. 4, 2019, and titled "Audio Streaming Charging Case," which application is herein incorporated by reference in its entirety.

BACKGROUND

The disclosure relates to audio system and related devices and methods, and particularly, to streaming audio data from a portable charging case.

SUMMARY

All examples and features mentioned below can be combined in any technically possible way.

According to one aspect of the present disclosure, a portable charging case is provided. The charging case includes a first charging interface configured to establish a first power transfer connection with a first wireless audio device, an audio data input, and circuitry arranged to wirelessly transmit, from the portable charging case to the first wireless audio device, a first audio data stream received from the audio data input.

In an example, the audio data input is provided by a case memory engaged with the portable charging case.

In an example, the portable charging case further includes an audio data input port to receive the audio data input, the audio data input port arranged to receive an audio data input cable, wherein the audio data input cable is arranged to transmit data corresponding to a first audio file.

In an example, the audio data input cable is arranged to transmit power from a first power source to a case battery of the portable charging case.

In an example, the circuitry is operatively arranged to automatically transmit the first audio stream to the first wireless audio device when the first audio data input port receives the audio data input cable.

In an example, the circuitry is arranged to store identification information indicating that the first wireless audio device has been wirelessly paired with the portable charging case. According to another aspect of the present disclosure, an audio system is provided. The audio system includes a first wireless audio device having a first antenna arranged to establish a first wireless connection with the portable charging case, and a portable charging case. The portable charging case includes a first charging interface configured to establish a first power transfer connection with the first wireless audio device, an audio data input, and circuitry arranged to wirelessly transmit, from the portable charging case to the first wireless audio device, a first audio data stream received from the audio data input.

In an example, the audio data input is provided by a case memory engaged with the portable charging case.

In an example, the portable charging case further comprises an audio data input port to receive the audio data input, the audio data input port arranged to receive an audio data input cable, wherein the audio data input cable is arranged to transmit data corresponding to a first audio file.

In an example, the audio data input cable is arranged to transmit power from a first power source to a case battery of the portable charging case.

In an example, the circuitry is operatively arranged to automatically transmit the first audio stream to the first wireless audio device when the audio data input port receives the audio data input cable.

In an example, the circuitry is arranged to store identification information indicating that the first wireless audio device has been wirelessly paired with the portable charging case. According to a further aspect of the present disclosure, an audio system is provided. The audio system includes a first wireless audio device having a first antenna arranged to establish a first wireless connection with the portable charging case, a second wireless audio device having a second antenna arranged to establish a second wireless connection with the portable charging case, and a portable charging case. The portable charging case includes a first charging interface configured to establish a first power transfer connection with the first wireless audio device, a second charging interface configured to establish a second power transfer connection with the second wireless audio device, an audio data input, and circuitry arranged to: (i) wirelessly transmit, from the portable charging case to the first wireless audio device, a first audio data stream received from the audio data input, and (ii) wirelessly transmit, from the portable charging case to the second wireless audio device, a second audio data stream received from the audio data input.

In an example, the audio data input is provided by a case memory engaged with the portable charging case.

In an example, the portable charging case further comprises an audio data input port to receive the audio data input, the audio data input port arranged to receive an audio data input cable, wherein the audio data input cable is arranged to transmit data corresponding to a first audio file.

In an example, the audio data input cable is arranged to transmit power from a first power source to a case battery of the portable charging case.

In an example, the circuitry is operatively arranged to automatically transmit the first audio stream to the first wireless audio device and automatically transmit the second audio stream to the second wireless audio device when the audio data input port receives the audio data input cable.

In an example, the circuitry is arranged to store identification information indicating that the first wireless audio device and the second wireless audio device have been wirelessly paired with the portable charging case.

In an example, the first wireless connection is established between the portable charging case and the first wireless audio device over a first time period and the second wireless connection is established between the portable charging case and the second wireless audio device over the first time period; or the first wireless connection is established between the portable charging case and the first wireless audio device over the first time period and the second wireless connection is established between the first wireless audio device and the second wireless audio device over a second time period.

In an example, the first audio data stream and the second audio data streams are sent via a wireless communication protocol, wherein the wireless communication protocol is selected from the group of: Bluetooth Low Energy (BLE), ZigBee, Z-wave, Near Field Communications (NFC), and Radio Frequency Identification (RFID).

DETAILED DESCRIPTION

The present disclosure is directed to audio systems for streaming audio data to wireless audio devices from a portable charging case. The portable charging case is arranged to charge first and second wireless audio devices as well as stream audio data to the first and second wireless audio devices. The portable charging case can store audio files/audio data within an internal memory, or receive audio data from an external source, e.g., streamed over a wireless connection to the charging case or via a cable arranged to transmit digital or analog audio data. The portable charging case is further arranged to automatically start streaming audio data to the first and/or second wireless audio devices when a cable is connected to the portable charging case.

Figure 1:
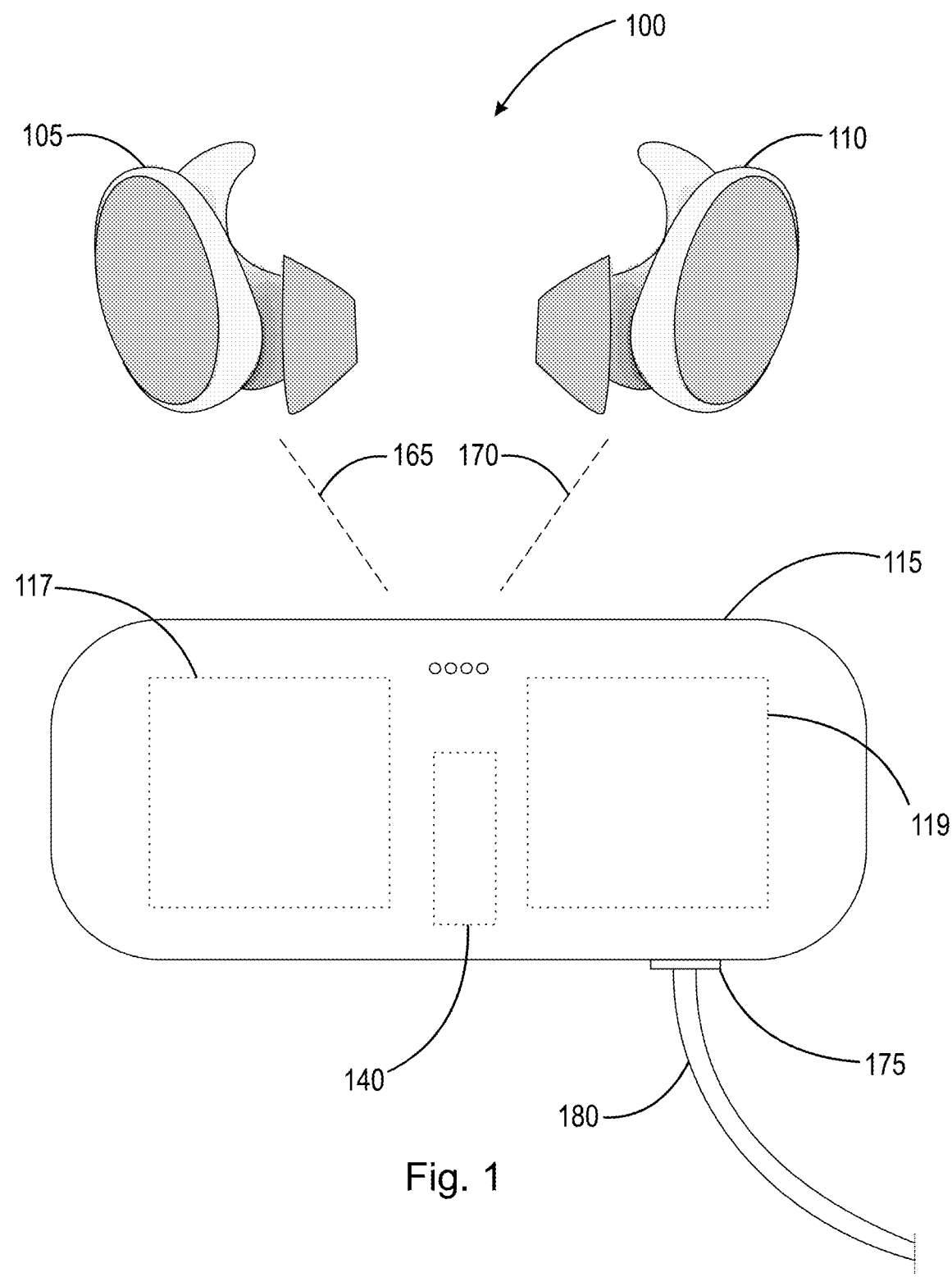
FIG. 1 illustrates an example of an audio system of the present disclosure.

Referring now to the drawings, FIG. 1 illustrates audio system 100. Audio system 100 includes first wireless audio device 105, second wireless audio device 110, and portable charging case 115. First wireless audio device 105 and second wireless audio device 110 are intended to be wireless headphones and are arranged to wirelessly communicate with portable charging case 115 and/or communicate with each other.

The term "headphone" refers to a device that fits around, on, in, or near an ear and that radiates acoustic energy into or towards the ear canal. Headphones are sometimes referred to as earphones, earpieces, headsets, earbuds or sport headphones, and can be wired or wireless. A headphone includes an acoustic driver to transduce audio signals to acoustic energy. The acoustic driver may be housed in an earcup. While some of the figures and descriptions following may show a single headphone, a headphone may be a single stand-alone unit or one of a pair of headphones (each including a respective acoustic driver and earcup), one for each ear. A headphone may be connected mechanically to another headphone, for example by a headband and/or by leads that conduct audio signals to an acoustic driver in the headphone. A headphone may include components for wirelessly receiving audio signals. A headphone may include components of an active noise reduction (ANR) system. Headphones may also include other functionality such as a microphone so that they can function as a headset. While FIGS. 1-4 show examples of in-ear headsets, in other examples the headset may be an around-ear, on-ear, or near-ear headset. In some examples, a headphone may be an open-ear device that includes an acoustic driver to radiate acoustic energy towards the ear canal while leaving the ear open to its environment and surroundings. In some examples, a headphone may be a part of audio enabled glasses.

Figure 2:
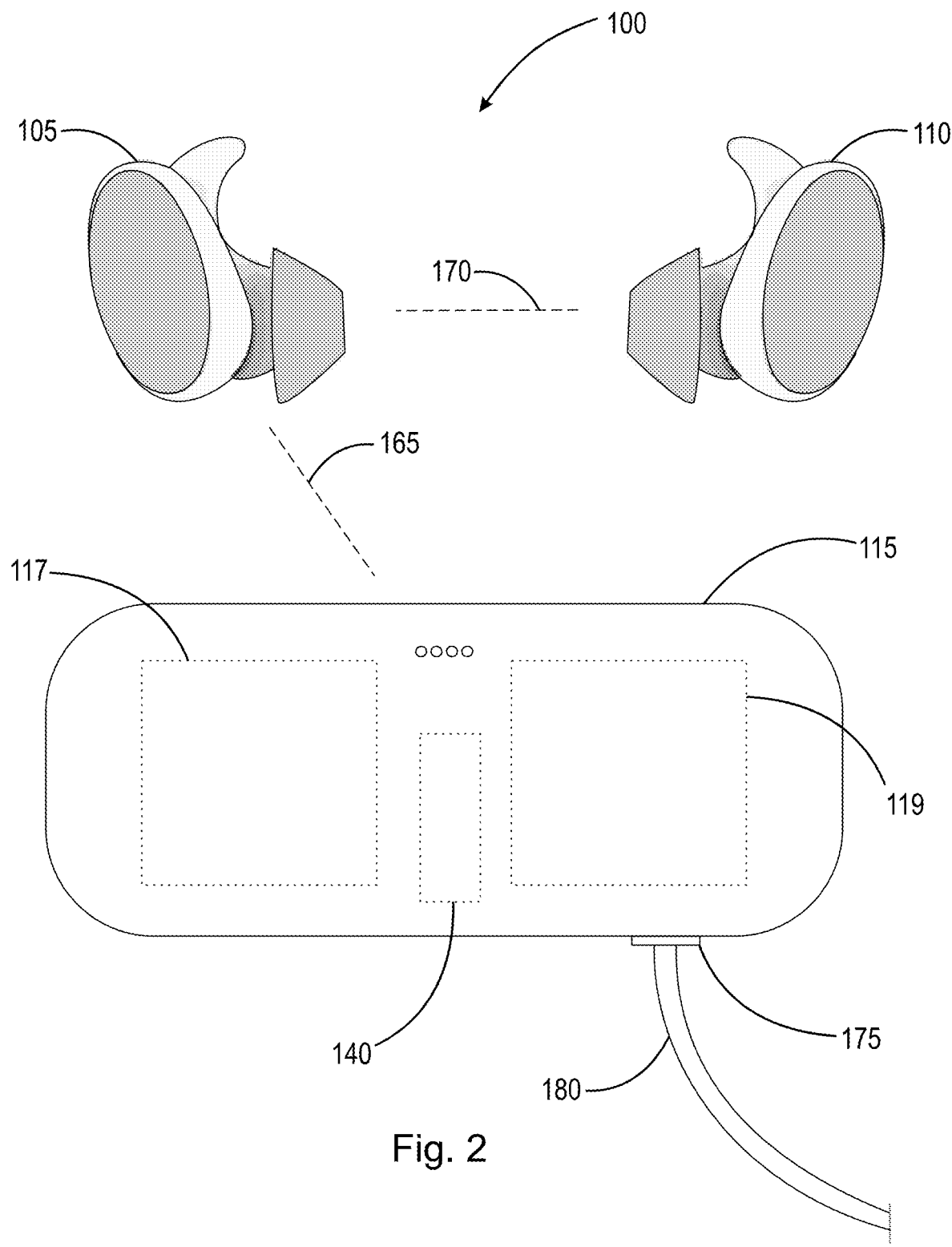
FIG. 2 illustrates an example of an audio system of the present disclosure.

Referring to FIG. 1, first wireless audio device 105 includes first antenna 120 (illustrated in FIG. 3) arranged to establish/facilitate wireless communication with portable charging case 115 and/or second antenna 130 (illustrated in FIG. 4) of second wireless audio device (discussed below), and first battery 125 (illustrated in FIG. 3) arranged to receive, store, and provide power for first wireless audio device 105 during operation. Second wireless audio device 110 includes second antenna 130 (illustrated in FIG. 4) arranged to establish/facilitate wireless communication with portable charging case 115 and/or first antenna 120 (illustrated in FIG. 3) of first wireless audio device 105, and second battery 135 (illustrated in FIG. 4) arranged to receive, store, and provide power for second wireless audio device 110 during operation. It should be appreciated that FIG. 1 illustrates an example of the present disclosure where portable charging case 115 establishes a wireless connection with both first wireless audio device 105 and second wireless audio device 110. FIG. 2 illustrates an example of the present disclosure where portable charging case 115 establishes a wireless connection with first wireless audio device 105, and first wireless audio device 105 establishes a wireless connection with second wireless audio device 110 (in alternative examples, portable charging case 115 establishes a wireless connection with second wireless audio device 110 and second wireless audio device 110 establishes a wireless connection with first wireless audio device 105). The wireless connections can be used for wireless communications, e.g., first connection 165 and second connection 170, can each transmit a first audio stream and a second audio stream respectively, as discussed below. In an example, first connection 165 and second connection 170 first establish a connection, e.g., a Bluetooth Low Energy (BLE) secure connection with first wireless audio device 105 and second wireless audio device 110, then subsequently begin transmitting a first audio stream and/or a second audio stream to each device via secure BLE with extended packets. This is discussed with more detail with respect to FIG. 5 below.

FIGS. 1 and 2 additionally illustrate that portable charging case 115 includes a first charging interface 117 and a second charging interface 119. First charging interface 117 is arranged to engage with, and provide an electrical charge to, first wireless audio device 105. Similarly, second charging interface 119 is arranged to engage with, and provide an electrical charge to, second wireless audio device 110. The electrical charge can be provided by case battery 160 (discussed below) and/or an external power source, e.g., any AC-DC, AC-AC, or DC-DC power supply. The charging interfaces could be wireless (e.g, inductive or resonance charging) or established via a physical connection (e.g., electrical contacts, pogo pins, etc.). Furthermore, it should be appreciated that each charging interface of portable charging case 115 can engage with and charge either wireless audio device. For example, first charging interface 117 can engage with, and provide an electrical charge to, first wireless audio device 105 and/or second wireless audio device 110. Additionally, second charging interface 119 can engage with, and provide an electrical charge to, first wireless audio device 105 and/or second wireless audio device 110. It should also be appreciated that these charging interfaces of the portable charging case 115 can provide an electrical charge to any wireless device while also establishing and/or maintaining the first audio stream and/or the second audio stream to first wireless audio device 105 and/or second wireless audio device 110. In other words, portable charging case 115 can: stream audio to first wireless audio device 105 while charging second wireless audio device 110; stream audio to second wireless audio device 110 while charging first wireless audio device 105; and/or charge a separate portable audio device other than first wireless audio device 105 and second wireless audio device 110 (for example, another pair or wireless audio devices, headphones, etc.), while simultaneously streaming audio to first wireless audio device 105 and second wireless audio device 110.

FIGS. 1 and 2 also illustrate that portable charging case 115 further includes audio input port 175 arranged to receive audio input cable 180. Audio input port 175 and audio input cable 180 can be selected from a number of available interfaces (i.e., connectors and receivers). For example, audio input cable 180 could utilize: a phone connector (tip, ring, sleeve) also called an audio jack, phone plug, jack plug, stereo plug, mini-jack, or mini-stereo. Accordingly, audio input port 175 could utilize a 6.35 mm (quarter inch), a 3.5 mm (miniature or ⅛ inch), or a 2.5 mm (subminiature) jack (both mono and stereo versions). Furthermore, audio input port 175 could utilize a USB cable (USB-A, USB-B, USB-C, mini-USB, micro-USB, USB 3) jack and audio input cable 180 could utilize a corresponding USB connector. It should be appreciated that the interface used between audio input cable 180 and audio input port 175 can be arranged to include any complementary interface combination known for sending/receiving/transmitting analog or digital audio data. It should be appreciated that audio input cable 180 could have any combination of male (connector) and female (jack) adaptability. In one example, the audio input is obtained from an external source via audio input cable 180. For example, the audio input cable could connect to a standard 3.5 mm auxiliary jack for streaming audio derived from in-flight entertainment. If used during in-flight entertainment, audio input cable 180 would have first end with a first connector, e.g., a 3.5 mm connector capable of interfacing with the 3.5 mm jack available to each passenger on the plane, while also having a second end with a second connector, e.g., a micro-USB connector capable of interfacing with the portable charging device 115, such that portable charging device 115 could be connected to the in-flight audio provided by the in-flight entertainment for that particular passenger.

Figure 3:
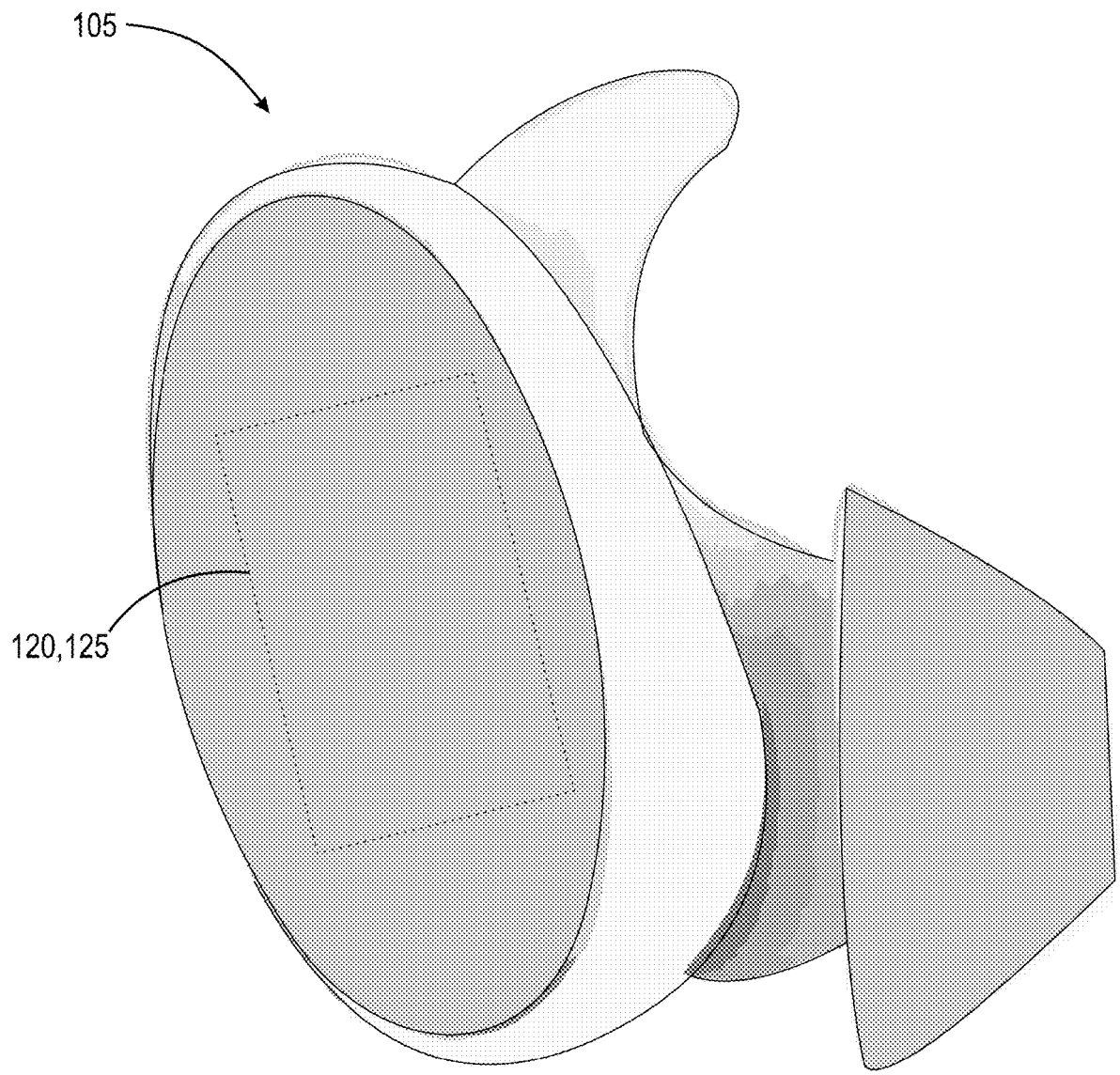
FIG. 3 illustrates one example configuration of a first wireless audio device according to the present disclosure.

FIG. 3 schematically illustrates the components of first wireless audio device 105, e.g., first antenna 120 and first battery 125. In some examples, first antenna 120 is a laser directed structured (LDS) antenna deposited on an external housing of the wireless audio device 105. It should be appreciated, that although not illustrated, first wireless audio device 105 can include a first CPU, a first memory, and a first speaker connected with first antenna 120 and first battery 125 to facilitate the wireless communication and/or wireless streaming capabilities discussed in the present disclosure. It should further be appreciated that first wireless audio device 105 can include at least one first charge connector arranged to establish a first power transfer connection with first charging interface 117 of portable charging case 115. For example, the first charge connector could include electrical contacts for establishing a physical connection with corresponding pogo pins in portable charging case 115.

Figure 4:
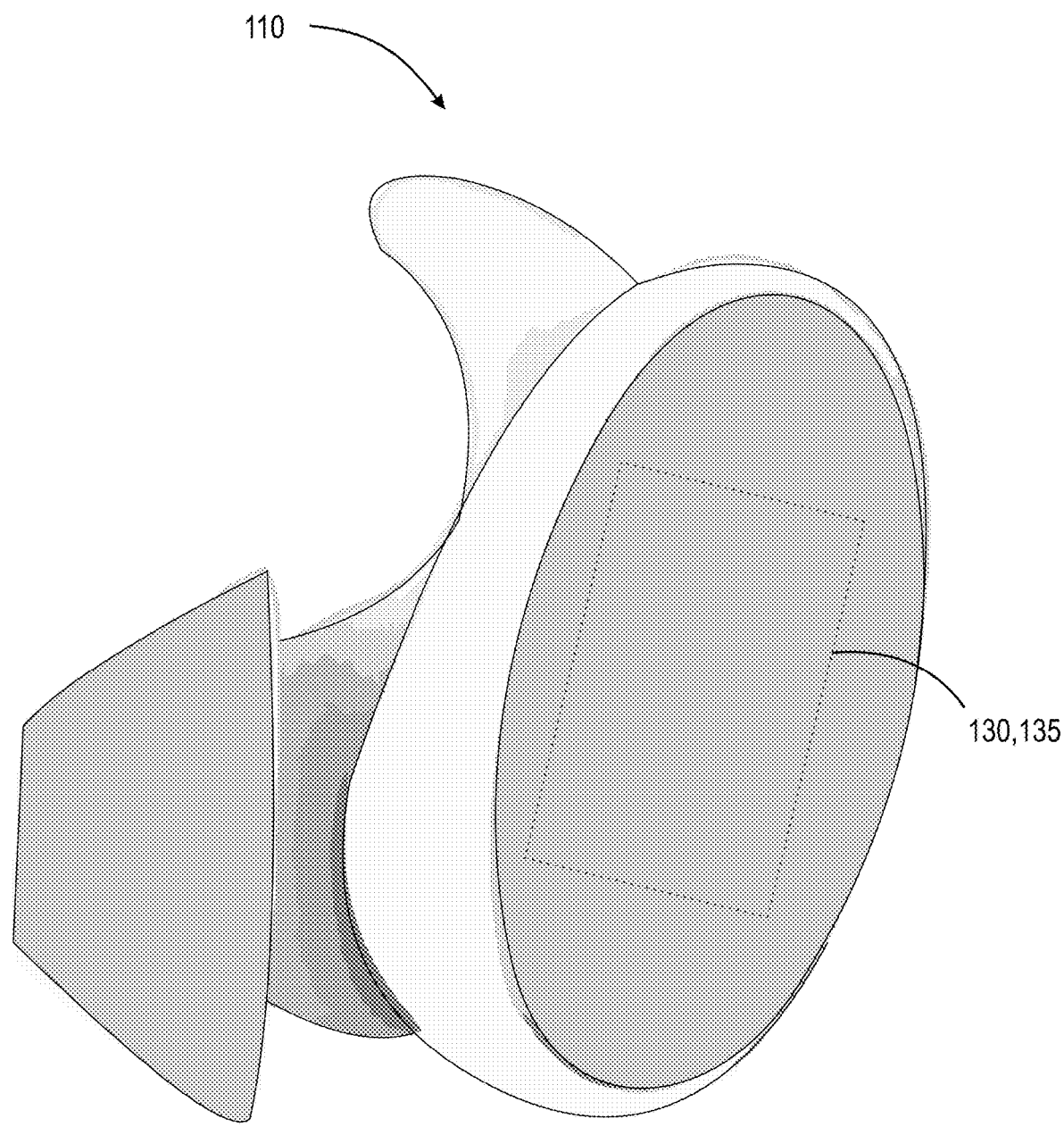
FIG. 4 illustrates one example configuration of a second wireless audio device according to the present disclosure.

FIG. 4 schematically illustrates the components of second wireless audio device 110, e.g., second antenna 130 and second battery 135. In some examples, second antenna 120 is a laser directed structured (LDS) antenna deposited on an external housing of the wireless audio device 105. It should be appreciated, that although not illustrated, second wireless audio device 110 can include a second CPU, a second memory, and a second speaker connected with second antenna 130 and second battery 135 to facilitate the wireless communication and/or wireless streaming capabilities discussed in the present disclosure. It should further be appreciated that second wireless audio device 110 can include at least one second charge connector arranged to establish a second power transfer connection with second charging interface 119 of portable charging case 115. For example, the second charge connector could include electrical contacts for establishing a physical connection with corresponding pogo pins in portable charging case 115.

Figure 5:
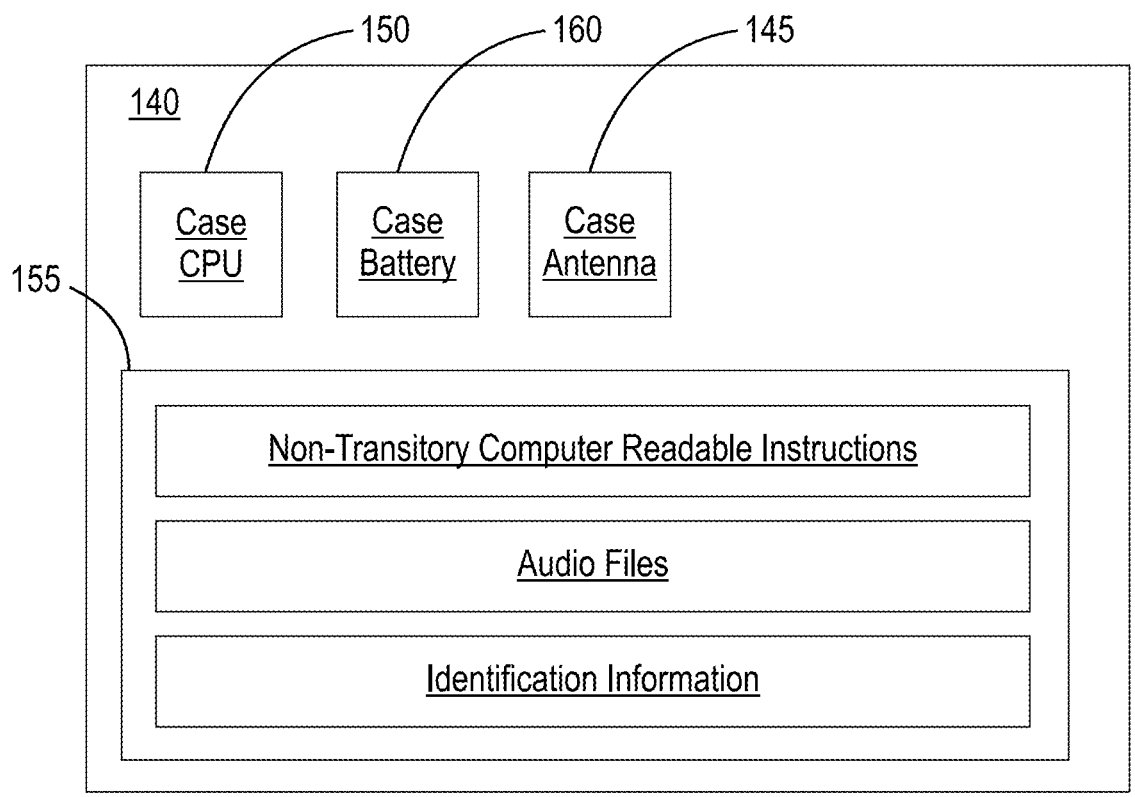
FIG. 5 schematically illustrates one example configuration of the circuitry included in the portable charging case according to the present disclosure.

Portable charging case 115 further includes circuitry 140 schematically illustrated in FIG. 5. Circuitry 140 includes case antenna 145, case Central Processing Unit (CPU) 150, case memory 155, and case battery 160. Case battery 160 is arranged to receive an electrical input, e.g., from audio input cable 180, or other cable arranged to transmit electrical power to be stored in case battery 160 for use by portable charging case 115. Case antenna 145 is arranged to establish/facilitate wireless communication, with first wireless audio device 105 and/or second wireless audio device 110. Case memory 155 is arranged to store, and case CPU 150 is arranged to execute, at least one set of non-transitory computer readable instructions to facilitate the functions of audio system 100 as described herein. In one example, the audio input is obtained directly from audio files, e.g., at least one digital audio file, stored in case memory 155 of portable charging case 115. Additionally, case memory 155 can store identification information of first wireless audio device 105 and second wireless audio device 110 for wireless pairing purposes with portable charging case 115.

The identification information discussed above may include a serial or identification number, nickname, manufacturer name, device model (e.g., brand name), media access control ("MAC") address, globally unique identifier ("GUID"), etc. of the audio devices that have been previously paired to the portable charging case 115. In other words, the identification information enables the portable charging case 115 to "remember" which audio devices it has connected to previously, e.g., for facilitating future or repeated connections to the remembered devices. The identification information may be stored as part of the protocols or standards utilized by circuitry 140, e.g., in accordance with standard Bluetooth protocols. In this way, the identification information enables the portable charging case 115 to "know" whether or not it has paired or connected to audio sources and/or to which audio sources the portable charging case 115 has previously paired. "Previously paired" is intended to include audio sources that are still currently paired to the portable charging case 115.

Case antenna 145 is arranged to establish first connection 165 (shown in FIG. 1) with first antenna 120 of first wireless audio device 105 and/or establish a second connection 170 (shown in FIG. 1) with second antenna 130 of second wireless audio device 110. First connection 165 (shown in FIG. 1) and second connection 170 (shown in FIG. 1) are used to stream audio via a wireless communication protocol over a first time period. The wireless communication protocol may be: Bluetooth, Bluetooth Low Energy (BLE), ZigBee, Z-wave, Near Field Communications (NFC), Radio Frequency Identification (RFID), or any other close-range wireless protocol sufficient to stream audio data in real-time. In one example, the wireless communication protocol is preferably BLE as the extended payload will allow for lower overall power consumption during operation. This may be desirable as form factor limitations of the first and second wireless audio devices may limit on-board battery capacity. It should be appreciated that, alternatively, portable charging case 115, via case antenna 145, can be arranged to establish first connection 165 (shown in FIG. 2) with first antenna 120 of first wireless audio device 105, and first antenna 120 of first wireless audio device 105 can be arranged to establish second connection 170 (shown in FIG. 2) with second antenna 130 of second wireless audio device 110. In this alternative example, it should be appreciated that first wireless audio device 105 may receive first audio stream over first connection 165 over a first time period, and establish second connection 170 for a second audio stream over a second time period (which may overlap the first time period). It may be necessary to induce an artificial lag at one or both of the wireless audio devices in further transmitting the audio data to the user so that first wireless audio device 105 and second wireless audio device 110 subsequently produce audio to a user contemporaneously.

Circuitry 140 is further arranged to determine whether a connection has been established between audio input port 175 and audio input cable 180. If circuitry 140 determines that this connection has been made, case antenna 145 automatically establishes wireless communication with first antenna 120 and/or second antenna 130 to establish first connection 165 and/or second connection 170. In operation, e.g., when engaging with in-flight entertainment, a user may plug the first end of audio input cable 180 into the provided in-flight entertainment jack (discussed above) and the second end of audio input cable 180 into portable charging case 115. Upon connecting the second end of audio input cable 180 with audio input port 175 of portable charging case 115, circuitry 140 automatically begins streaming audio data obtained from the in-flight entertainment jack to first wireless audio device 105 and/or second wireless audio device 110. In an example, first connection 165 and second connection 170 are not established until second end of audio input cable 180 is inserted into audio input port 175 of case 115. Upon connecting the second end of audio input cable 180 with audio input port 175 of portable charging case 115, circuitry 140 automatically establishes first connection 165 and second connection 170 and subsequently begins streaming audio data obtained from the in-flight entertainment jack to first wireless audio device 105 and/or second wireless audio device 110.

Figure 6:
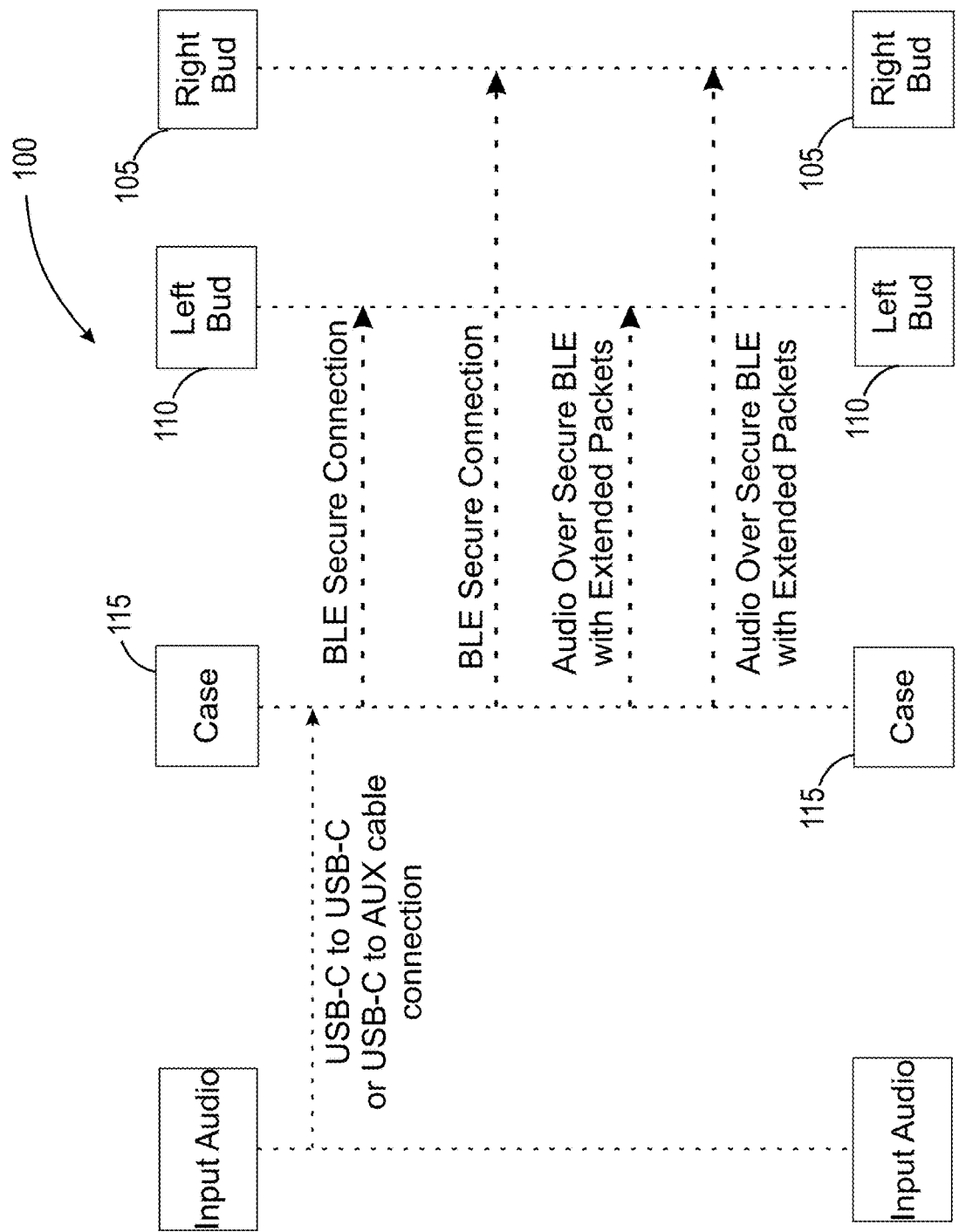
FIG. 6 schematically illustrates one example configuration of an audio system according to the present disclosure.

FIG. 6 illustrates audio system 100 according to the present disclosure. As illustrated, an input audio is provided where the input audio could be, for example, in-flight entertainment or any other audio source, e.g., a personal computer. A connection is made, e.g., with a USB-C to USB-C, USB-C to AUX cable, or audio input cable 180 (as discussed above), between the input audio and portable charging case 115. In an example, portable charging case 115, upon establishing this connection with the input audio, automatically begins streaming the input audio to first wireless audio device 105 and/or second wireless audio device 110. In an example, a computer implemented application, e.g., a smartphone application paired with portable charging case 115, could be utilized to configure portable charging case 115 such that it begins streaming the input audio to first wireless audio device 105 and/or second wireless audio device 110 automatically upon the establishment of this physical connection, or in the alternative, when a particular input is received via the application. It should be appreciated that it is not necessary for there to be an external input audio, e.g., portable charging case 115 can store the input audio within memory 155. It should also be appreciated that a computer implemented application, e.g., a smartphone application paired with portable charging case 115 could be configurable to allow control/configuration of portable charging case 115 such that a user utilizing the application can configure portable charging case 115 to switch between streaming from an external input audio, i.e., in-flight entertainment, and streaming from audio input/audio files stored in memory 155. It should be understood that the computer implemented application could be utilized to configure portable charging case 115 as well as perform/implement any of the necessary computer readable steps discussed above.

During operation, and after portable charging case 115 determines that it should establish first connection 165 and second connection 170 with first wireless audio device 105 and second wireless audio device 110, respectively, a Bluetooth Low Energy connection is established between first wireless audio device 105 (right bud) and second wireless audio device 110 (left bud). Once these connections are established and a response is received from each wireless audio device, portable charging case 115 can establish first connection 165, e.g., streaming audio over secure BLE with extended packets to first wireless device 105 (right bud); and establish second connection 170, e.g., streaming audio over BLE with extended packets to second wireless device 110 (left bud).

It should be appreciated that although examples illustrated and described herein describe and depict an audio system which includes two separate wireless audio devices, it is understood that only one wireless audio device is necessary and/or only one wireless connection needs to be established, e.g., if a first and second headphone are physically connected, i.e., part of a single housing. It should further be appreciated that it is possible to establish communications between the various components discussed herein via wired connections only, or any combination of wired connections and wireless connections.

The above-described examples of the described subject matter can be implemented in any of numerous ways. For example, some examples may be implemented using hardware, software or a combination thereof. When any aspect of an example is implemented at least in part in software, the software code can be executed on any suitable processor or collection of processors, whether provided in a single device or computer or distributed among multiple devices/computers.

The present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

The computer readable program instructions may be provided to a processor of a special purpose computer, or other programmable data processing apparatus to produce a machine, such that the instructions, which execute via the processor of the computer or other programmable data processing apparatus, create means for implementing the functions/acts specified in the block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the block diagram or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the block diagram block or blocks.

The block diagram in the drawings illustrates the architecture, functionality, and operation of possible implementations of systems, methods, and computer program products according to various examples of the present disclosure. In this regard, each block in the block diagram may represent a module, segment, or portion of instructions, which comprises one or more executable instructions for implementing the specified logical function(s). It will also be noted that each block of the block diagram illustration, and combinations of blocks in the block diagrams, can be implemented by special purpose hardware-based systems that perform the specified functions or acts or carry out combinations of special purpose hardware and computer instructions.

Other implementations are within the scope of the following claims and other claims to which the applicant may be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, other examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The invention claimed is:

1. A portable charging case, comprising:
   a first charging interface configured to establish a first power transfer connection with a first wireless audio device;
   an audio data input port arranged to receive an audio data input cable; and
   circuitry arranged to wirelessly transmit, from the portable charging case to the first wireless audio device, a first audio data stream received from the audio data input port, wherein the audio data input cable is arranged to transmit data corresponding to a first audio file.

2. The portable charging case of claim 1, wherein the audio data input cable is arranged to transmit power from a first power source to a case battery of the portable charging case.

3. The portable charging case of claim 1, wherein the circuitry is operatively arranged to automatically transmit the first audio data stream to the first wireless audio device when the first audio data input port receives the audio data input cable.

4. The portable charging case of claim 1, wherein the circuitry is arranged to store identification information indicating that the first wireless audio device has been wirelessly paired with the portable charging case.

5. The portable charging case of claim 1, wherein the first audio data stream is sent via a wireless communication protocol, wherein the wireless communication protocol comprises at least one of: Bluetooth Low Energy (BLE), ZigBee, Z-wave, Near Field Communications (NFC), and Radio Frequency Identification (RFID).

6. The method of claim 5, wherein the portable charging case further comprises a second charging interface configured to establish a second power transfer connection with the second wireless audio device.

7. The portable charging case of claim 1, further comprising a second charging interface configured to establish a second power transfer connection with a second wireless audio device.

8. The portable charging case of claim 7, wherein the circuitry is further arranged to wirelessly transmit, from the portable charging case to the second wireless audio device, a second audio data stream received from the audio data input port.

9. The portable charging case of claim 8, wherein the circuitry is operatively arranged to automatically transmit the second audio data stream to the second wireless audio device when the first audio data input port receives the audio data input cable.

10. The portable charging case of claim 8, wherein the circuitry is arranged to store identification information indicating that the second wireless audio device has been wirelessly paired with the portable charging case.

11. The portable charging case of claim 1, wherein the audio data input port comprises at least one of: 6.35 mm jack, 3.5 mm jack, 2.5 mm jack, USB-A jack, USB-B jack, USB-C jack, mini-USB jack, micro-USB, and USB 3 jack.

12. The portable charging case of claim 1, wherein the circuitry comprises a case antenna configured to transmit the first audio data stream.

13. A method for wirelessly streaming audio data, comprising:

receiving, by an audio data input port of a portable charging case, an audio data input cable; and wirelessly streaming, from the portable charging case to the first wireless audio device, via circuitry of the portable charging case, a first audio data stream received from the audio data input port, wherein the audio data input cable is arranged to transmit data corresponding to the first audio stream.

14. The method of claim 13, wherein the portable charging case comprises a first charging interface configured to establish a first power transfer connection with a first wireless audio device.

15. The method of claim 13, further comprising wirelessly streaming, from the portable charging case to a second wireless audio device, a second audio data stream received from the audio data input port, wherein the audio data input cable is arranged to transmit data corresponding to the second audio stream.

16. The method of claim 13, further comprising:
wirelessly streaming, from the portable charging case to the first wireless audio device, a second audio data stream received from the audio data input port, wherein the audio data input cable is arranged to transmit data corresponding to the second audio stream; and wirelessly streaming, from the first wireless audio device to a second wireless audio device, the second audio data stream.

17. The method of claim 13, wherein the audio data input cable is arranged to transmit power from a first power source to a case battery of the portable charging case.

18. The method of claim 13, wherein the circuitry is operatively arranged to automatically stream the first audio stream to the first wireless audio device when the first audio data input port receives the audio data input cable.

19. The method of claim 13, wherein the circuitry is arranged to store identification information indicating that the first wireless audio device has been wirelessly paired with the portable charging case.

20. The method of claim 13, wherein the first audio data stream is transmitted via a wireless communication protocol, wherein the wireless communication protocol comprises at least one of: Bluetooth Low Energy (BLE), ZigBee, Z-wave, Near Field Communications (NFC), and Radio Frequency Identification (RFID).

* * * * *